United States Patent [19]
Silverman et al.

[11] 3,895,445
[45] July 22, 1975

[54] ADHESIVE COMPOSITIONS

[76] Inventors: Elliott Silverman, 4829 Alantic Ave., Ventnor, N.J. 08406; Morton Cohen, 1201 Wrack Rd., Meadowbrook, Pa. 19046

[22] Filed: Aug. 1, 1973

[21] Appl. No.: 384,484

Related U.S. Application Data

[63] Continuation of Ser. No. 195,857, Nov. 4, 1971, abandoned.

[52] U.S. Cl. .............................................. 32/14 R
[51] Int. Cl.² ........................................ A61C 7/00
[58] Field of Search ....................................... 32/14

[56] References Cited
UNITED STATES PATENTS
3,345,745   10/1967   Muller ................................ 32/14 A

*Primary Examiner*—Robert Peshock
*Attorney, Agent, or Firm*—Robert K. Youtie

[57] ABSTRACT

A composition and method for bonding orthodontic appliances to teeth. The composition comprises a thermosetting resin composite which adheres to tooth enamel, and a methacrylic acid ester mixture which penetrates the thermosetting resin composite and adheres to orthodontic appliances.

1 Claim, No Drawings

ADHESIVE COMPOSITIONS

This is a continuation of application Ser. No. 195,857 filed Nov. 4, 1971 and now abandoned.

This invention relates generally to adhesives, and more particularly to a novel bonding system, and to its use in orthodontic therapy to secure orthodontic appliances to the teeth.

Present orthodontic practices generally include the securement of wire-receiving brackets to the patient's teeth, and the engagement of wire in such brackets, as by the light-wire, edgewise and other techniques, to effect the desired tooth movement. Securement of a bracket to its corresponding tooth is generally accomplished by means of a metal band which is attached to the bracket and circumposed about the tooth. This securement system, while providing an excellent transfer of forces from the bracket to the tooth, has the very important disadvantage that it creates a high risk of tooth decay since food particles often lodge in the difficult to clean regions between the metal bands and their corresponding teeth.

The profession has recognized the decay problem and suppliers of orthodontic materials have sought to obviate the necessity of the metal bands by providing a chemical bonding composition for securing the brackets to the teeth. One example of such a composition is that produced by GAC International Inc., Farmingdale, New York and sold under the trademark Bracket Bond. This composition, although of substantial utility has, because of the lack of permanence of the bond formed with the tooth, been restricted in use to those instances where the desired tooth movement can be achieved without the application of severe forces or can be achieved over a period of several months. This product is the mixture of a 1:1 powder blend of polymethyl methacrylate and polycyclohexyl methacrylate in liquid hexyl methacrylate. The ratio of powder to liquid is about 2:1. This type of product is referred to herein as a thermoplastic bonding composition.

Another development in the field of dentistry has been the formulation of enamel adhesive sealers. An adhesive composition is bonded to the pits and fissures of teeth to prevent dental caries in these highly susceptible areas. These adhesives are generally based on a material which is the reaction product of bisphenol A and an epoxy ester of methacrylic acid, which may optionally be compounded with a filler, see U.S. Pat. No. 3,066,112. This type of product is referred to herein as a thermosetting sealer composition.

According to this invention a novel adhesive or bonding system is provided which comprises a thermosetting sealer composition and a thermoplastic bonding composition. The combination of these two compositions may be adopted to provide a chemical bracket-to-tooth bond which has a high bond strength and a long life in orthodontic applications.

With regard to the bonding of a bracket to a tooth utilizing the bonding system of this invention, the first step involves the coating of a section of the tooth with the thermosetting portion of the adhesive since these thermosetting sealers are well-known to the dentist, their selection in accordance with this invention will present no problem to the practitioner, as he will be able to select that sealer with which he is most familiar. Furthermore, the practitioner will be familiar with the procedure for applying the selected sealer to the tooth, since the procedure is essentially the same as that employed where the sealer is applied for the purpose of sealing fissures and the like. Thorough cleaning of the tooth and application of a thin coating of sealer comprises the preferred procedure.

After the resin has set, the bracket of a type having a plastic or metal surface is bonded to the coated tooth by means of the thermoplastic bonding composition. Like the thermosetting sealer, the thermoplastic bonding composition also is a material with which the orthodontist is familiar; the previously mentioned Bracket Bond is a preferred material. The thermoplastic material is applied to either the surface of the bracket or the coated portion of the tooth, and if desired may be applied to both; the surface of the bracket is then positioned adjacent the coated portion of the tooth and held in position until the bonding composition has hardened.

The bonding system of this invention may be used to bond a bracket of any desired configuration. Several examples of suitable brackets are described in copending application Ser. No. 195,857, filed Nov. 4, 1971, Silverman, Elliott, and Cohen.

Applications of the previously mentioned compositions and procedures are illustrated by the following example:

EXAMPLE I

A tooth was cleaned with polishing brushes and pumice, and air dried. The tooth was further conditioned by rubbing a 50% phosphoric acid solution containing 7.0% dissolved zinc oxide on the tooth with a small cotton pellet, washing with water and drying with compressed air.

The sealer selected was Nuva Seal, sold by the Dentaply Company, L. D. Caulk Division, and containing as the major ingredients about 3 parts by weight of the reaction product of bisphenol A and glycidyl methacrylate, and 1 part by weight of mothylmethacrylate monomer. This sealer is a relatively stable, thick liquid. As per the instructions of the manufacturer, immediately before using, about 2.0% Benzoin Methyl Ether (a product of Distillation Products Industries, Eastman Kodak Co.) was dissolved in the liquid to form an ultraviolet light-sensitive composition. This composition was then painted on the surface of the tooth and exposed to long-wave ultraviolet light to cause setting of the resin. After setting, which required only a few seconds, the surface of the sealer was wiped with a cotton roll to remove any traces of unpolymerized surface sealer.

Bracket Bond was then applied to the coated tooth with a fine brush and a plastic bracket positioned adjacent the tooth. The bracket was held in place until the Bracket Bond had air-hardened.

The bond formed between the bracket and tooth was strong, meeting all the requirements of orthodontic therapy.

EXAMPLE II

The process was carried out in accordance with Example I except that the sealer also contained 5% of a finely powdered suspension of synthetic calcium hydroxyapatite and 2.5% calcium fluoride. Results were similar to those obtained in Example I.

The thermosetting resin useful in the present invention comprises the reaction product of bisphenol A with glycidyl methacrylate, which is depicted as:

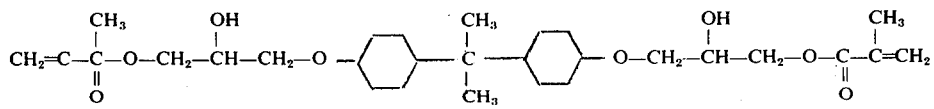

Thermosetting sealer compositions comprise this product with an ester of methacrylic acid, such as methyl methacrylate, glycidyl dimethacrylate or triethyleneglycol bismethacrylate. An organic or inorganic filler, such as quartz, silica, alumina, barium oxide, barium fluoride, boric oxide, may be added into the thermosetting resin if desired. A wide variety of such compositions has already been extensively tested as sealers and reported in the literature.

The thermoplastic bonding composition comprises a mixture of a polymer and monomer of a methacrylic acid ester which hardens rapidly with a minimum of shrinkage. It has been found that a mixture of such methacrylic acid esters gives the best combination of bonding properties. The preferred group of methacrylic acid esters contain from one to eight carbon atoms in the ester portion. They are depicted as follows:

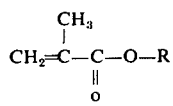

wherein R is a hydrocarbon group having from one to eight carbon atoms, such as methyl, hexyl, and cyclohexyl. For each reference to methacrylic acid and its esters herein, it should be noted that similar materials can be substituted, primarily the esters of acrylic acid.

The composite bond of the present invention is a layer of the thermosetting sealer composition adjacent the thermoplastic bonding composition. A sectional study under an election microscope (12000X magnification) of the boundry layer between the two compositions, prepared as set forth in Example I, showed that the thermoplastic bonding composition penetrated the thermosetting sealer composition.

This invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

What is claimed is:

1. An adhesive bond adapted to join an orthodontic bracket to a tooth comprising a layer for securement to a tooth of a set thermosetting sealing composition adjacent a layer of a hardened thermoplastic bonding composition for securement to a bracket wherein at the boundary between the two the thermoplastic bonding composition has penetrated the thermosetting sealer composition, and wherein the thermosetting sealing composition contains as major ingredients about 3 parts by weight of the reaction product of bisphenol A and glycidyl methacrylate, and 1 part by weight of methylmethacrylate and the thermoplastic bonding composition comprises a blend of polymethyl methacrylate and polycyclohexyl methacrylate in hexyl methacrylate.

* * * * *